(12) United States Patent
Keen et al.

(10) Patent No.: US 9,246,432 B2
(45) Date of Patent: Jan. 26, 2016

(54) REGENERATIVE BRAKING SAFETY SYSTEM AND METHOD OF USE

(75) Inventors: Ronald T. Keen, Indianapolis, IN (US); Jason L. Hessler, Noblesville, IN (US)

(73) Assignee: Beckman Coulter, Inc., Brea, CA (US)

( * ) Notice: Subject to any disclaimer, the term of this patent is extended or adjusted under 35 U.S.C. 154(b) by 31 days.

(21) Appl. No.: 13/369,106

(22) Filed: Feb. 8, 2012

(65) Prior Publication Data
US 2012/0206071 A1 Aug. 16, 2012

Related U.S. Application Data (60) Provisional application No. 61/442,703, filed on Feb. 14, 2011.

(51) Int. Cl.
| | |
|---|---|
| H02K 7/10 | (2006.01) |
| H02P 29/04 | (2006.01) |
| B04B 9/10 | (2006.01) |
| H02P 29/02 | (2006.01) |
| H02P 3/14 | (2006.01) |
| H02J 3/38 | (2006.01) |

(52) U.S. Cl.
CPC . *H02P 29/04* (2013.01); *B04B 9/10* (2013.01); *H02P 3/14* (2013.01); *H02P 29/025* (2013.01); *H02J 3/383* (2013.01); *Y02E 10/563* (2013.01)

(58) Field of Classification Search
USPC ............ 318/375, 376, 759, 400.09, 741, 779, 318/809, 758, 763, 802, 430, 139, 805, 362, 318/373, 612, 87, 742, 757, 258, 269, 261, 318/273; 187/290, 29, 296
See application file for complete search history.

(56) References Cited

U.S. PATENT DOCUMENTS

| 3,760,269 | A | * | 9/1973 | Beeman | ................. H04Q 1/457 324/76.44 |
|---|---|---|---|---|---|
| 4,503,940 | A | * | 3/1985 | Watanabe | ................. H02P 3/18 187/290 |
| 4,546,437 | A | * | 10/1985 | Bleckmann et al. | ............ 701/70 |
| 5,203,762 | A | | 4/1993 | Cooperstein | |
| 5,283,726 | A | | 2/1994 | Wilkerson | |
| 5,608,301 | A | | 3/1997 | Inaniwa | |

(Continued)

FOREIGN PATENT DOCUMENTS

| DE | 199 32 721 C1 | 1/2001 |
|---|---|---|
| DE | 10 2005 015 714 A1 | 10/2006 |

(Continued)

OTHER PUBLICATIONS

International Search Report and Written Opinion for PCT/US2012/024837 mailed Apr. 9, 2013.

*Primary Examiner* — Shawki S Ismail
*Assistant Examiner* — Jorge L Carrasquillo
(74) *Attorney, Agent, or Firm* — Merchant & Gould P.C.

(57) ABSTRACT

A centrifuge includes a regenerative braking safety system including an electrical system reversibly coupled to a power source. A motor is coupled to the electrical system. The motor is capable of driving a rotor using power delivered through the electrical system, and is further capable of supplying the electrical system with recovered energy. The recovered energy is electrical energy converted from kinetic energy of the rotor during regenerative braking of the motor. The safety system includes a power cut-off configured to disable the effect of regenerative braking of the motor when the electrical system is decoupled from the power source.

24 Claims, 6 Drawing Sheets

(56) References Cited

U.S. PATENT DOCUMENTS

| | | |
|---|---|---|
| 5,726,550 A | 3/1998 | Inaniwa |
| 5,731,681 A * | 3/1998 | Inaniwa et al. ............... 318/729 |
| 6,602,178 B2 | 8/2003 | Inaniwa et al. |
| 2002/0092802 A1 | 7/2002 | Evana, III et al. |
| 2004/0245961 A1 | 12/2004 | Ueda et al. |
| 2007/0024213 A1 | 2/2007 | Shteynberg et al. |
| 2007/0103949 A1 | 5/2007 | Tsuruya |
| 2011/0276214 A1 * | 11/2011 | Matsumoto .................... 701/22 |

FOREIGN PATENT DOCUMENTS

| | | |
|---|---|---|
| DE | 10 2007 011 655 A1 | 9/2008 |
| EP | 0 352 419 A2 | 1/1990 |
| EP | 0 488 240 A1 | 6/1992 |
| EP | 2 079 141 A1 | 7/2009 |
| JP | 55127805 A * | 10/1980 |

* cited by examiner

REGENERATIVE BRAKING SAFETY SYSTEM AND METHOD OF USE

CROSS-REFERENCE TO RELATED APPLICATIONS

This application claims priority to and the benefit of U.S. Provisional Patent Application Ser. No. 61/442,703, filed Feb. 14, 2011, entitled "Regenerative Braking Safety System and Method of Use," the disclosure of which is hereby incorporated by reference herein in its entirety.

INTRODUCTION

An AC induction motor (ACIM) works by controlling "slip," which is the difference between the rotating magnetic field frequency and the actual motor rotational frequency. This slip translates into the amount of torque applied to the load. When decelerating an ACIM, this slip becomes negative and the ACIM turns into an energy generator as rotational or kinetic energy is converted into electrical energy. In previous centrifuge designs, this energy has typically been dissipated in "brake resistors" that generate heat. Due to the current economic and energy-conscious environment, the preference of the market is to return this extra energy to the power grid, rather than dissipate it in the form of heat. Depending on the type of instrument containing the ACIM, the amount of energy generated during motor deceleration may be large enough that it can not only maintain power to the instrument itself for some period of time, but also return a significant amount of electrical power to the power grid. This is typically called regenerative braking.

Should the instrument be removed from the power grid during regenerative braking (for instance by the instrument main power switch or by removal of the power plug from an outlet), the instrument will still generate power until the ACIM is no longer driven by a rotating magnetic field. This situation could be potentially dangerous.

In one case, the user may intentionally disconnect power to the instrument while regenerative braking is occurring, such as by turning off a main power switch or some other switch that effectively disconnects the instrument from the power grid. The reason a user will disconnect power in this way is typically to cause the instrument to cease operation in case of an emergency. However, when the instrument is regeneratively braking, it does not cease operation until the level of regenerated power is less than the amount of power needed for full instrument operation. In such a case, the user desires that the instrument cease operation, but the instrument continues operation for a period of time.

In another case, the user may pull the instrument power plug from a wall outlet, again to cause the instrument to cease operation. During regenerative braking, however, the instrument will continue to operate. Furthermore, while it is regenerating power, the instrument may also be presenting hazardous voltages to the user, as it is designed to return power to the power grid, and the plug has become a live power terminal.

Additionally, in certain circuits that detect electrical faults or other safety-critical conditions, software in the system may attempt to trip a circuit breaker via a relay if certain conditions are met. Such a condition may include, for example, removal of a panel from the device that exposes high-voltage electrical components. System software may attempt to turn off the breaker, but regenerative braking will keep the instrument running, thereby continuing instrument operation even in a potentially dangerous condition.

These and other circumstances make a safety control system for a regenerative breaking system desirable. A control system for an ACIM adapted to use regenerative braking needs to determine when the external AC power is removed either due to actions of an operator (e.g., unplugging, opening a panel), or due to other incidents (e.g., tripping of a circuit breaker) and prevent unwanted hazardous voltages during braking periods. The key to controlling this condition, then, is to properly detect when external AC power or the connection to the power grid is removed from the instrument and to switch the circuit over into a brake resistor configuration or some other safe configuration.

Some commercial power supplies provide a signal called "AC power fail" that could be used to indicate the removal of AC power. These "power fail" detectors will generally look for a loss of an AC voltage waveform but, in an instrument such as a centrifuge while regenerative braking is occurring, the various components (such as a roughing vacuum pump) may have impedance characteristics that continue to maintain an AC voltage waveform in the power line when operating off the regenerated power such that commercial power supplies still consider this to be a valid power source. In such a case, the "AC power fail" indicator never shows that power has been removed.

Another way of detecting regenerative braking when external power has been disconnected is based on detecting an undesirable increase in voltage. For example, at the start of regenerative braking there is enough energy generated that, if the external power is removed, the inverter bus voltage will quickly rise. ACIM control systems are usually designed to have a voltage monitor that will detect high bus voltage and turn off regenerative braking of the motor.

It has been determined that the two safety mechanisms described above may not adequately provide protection throughout the regenerative braking cycle of an instrument. Depending on the instrument and how the overvoltage protection is implemented, there may be a significant portion of the regenerative braking cycle during which disconnection from external power will not trigger the overvoltage protection but also will not cause the instrument to cease operation. That is, there is a portion of the regenerative braking cycle during which there will be sufficient regenerated power to maintain operation of the instrument, but not so much that a bus overvoltage condition will occur. If disconnected from AC power during this portion of the regenerative braking cycle, unsafe situations could arise.

SUMMARY

In one aspect, the technology relates to a centrifuge having: an electrical system reversibly coupled to a power source; a motor coupled to the electrical system, wherein the motor is capable of driving a rotor using power delivered through the electrical system, wherein the motor is further capable of supplying the electrical system with recovered energy, wherein said recovered energy is electrical energy converted from kinetic energy of the rotor during regenerative braking of the motor; and a power cut-off configured to disable the effect of regenerative braking of the motor when the electrical system is decoupled from the power source. In an embodiment, the power cut-off includes a detector arranged to monitor an output value associated with the recovered energy, wherein the power cut-off is configured to disable the effect of regenerative braking of the motor when the output value is outside of a predetermined range, wherein said predetermined range is characteristic of the recovered energy supplied by the motor while the electrical system is coupled to the power source. In another embodiment, the output value is one of a frequency, an impedance, a voltage, and a current flow. In yet another embodiment, the output value is a frequency. In still another embodiment, the power cut-off is configured to prevent the motor from converting kinetic energy of the rotor into electrical energy when the electrical system is decoupled from the power source.

In an embodiment of the above aspect, the motor is an AC induction motor driven by a rotating magnetic field and wherein the power cut-off is configured to de-energize the rotating magnetic field when the electrical system is decoupled from the power source. In another embodiment, the electrical system includes a shunt circuit to safely dissipate the recovered energy, wherein the power cut-off is configured to redirect the recovered energy to the shunt circuit when the electrical system is decoupled from the power source. In yet another embodiment, the electrical system includes a plug to reversibly couple the electrical system to a power outlet of the power source, wherein the power cut-off is configured to disable the effect of regenerative braking of the motor when the plug is unplugged from the power outlet. In still another embodiment, the power cut-off is configured to prevent recovered power from reaching the plug when the plug is unplugged from the power outlet.

In an embodiment of the above aspect, the power cut-off is configured to disable the ability of the motor to convert kinetic energy into electrical energy when the plug is unplugged from the power outlet. In another embodiment, the electrical system is reversibly coupled to the power source through a main power switch, wherein the power cut-off is configured to disable the effect of regenerative braking of the motor when the main power switch is switched to an off position. In yet another embodiment, the electrical system is reversibly coupled to the power source through a main circuit breaker, wherein the power cut-off is configured to disable the effect of regenerative braking of the motor when the main circuit breaker is tripped. In still another embodiment, the electrical system includes a safety system adapted to detect an electrical fault in the electrical system, wherein the electrical system is reversibly coupled to the power source through a safety switch activated by the safety system if an electrical fault is detected, wherein the power cut-off is configured to disable the effect of regenerative braking of the motor when the safety switch is activated by the safety system.

In an embodiment of the above aspect, the electrical system includes an electrical component powered by the recovered energy, wherein the power cut-off is configured to prevent the electrical component from receiving recovered energy when the electrical system is decoupled from the power source. In another embodiment, the centrifuge further includes a comparator that detects when the motor is in a state of regenerative braking, wherein the power cut-off is configured to disable the effect of regenerative braking when the electrical system is decoupled from the power source while the comparator detects that the motor is in a state of regenerative braking.

In another aspect, the technology relates to a centrifuge having: a circuit reversibly coupled to a power source; a motor coupled to the circuit to receive power from the power source to drive the motor, the motor capable of returning power to the circuit by converting rotational energy into electrical energy; and a power cut-off configured to disable the capability of the motor to return power to the circuit when the circuit is decoupled from the power source. In an embodiment, the power cut-off includes a detector configured to monitor an output value associated with the power returned to the circuit by the motor, wherein the power shut-off is configured to disable the capability of the motor to return power to the circuit when the monitored output value is outside of a predetermined range, wherein said predetermined range is characteristic of the power returned by the motor to the circuit while the circuit is coupled to the power source. In another embodiment, the output value is a frequency. In yet another embodiment, the power cut-off is configured to disable the ability of the motor to convert rotational energy into electrical energy when the circuit is decoupled from the power source. In still another embodiment, the power shut-off is configured to safely dissipate the power returned to the circuit by the motor at a point upstream of the power source.

In an embodiment of the above aspect, the power shut-off includes a relay that terminates an electrical connection between the motor and the power source. In another embodiment, the centrifuge further includes an inverter that delivers power input to the motor and a microprocessor that sends a motor control signal to the inverter. In yet another embodiment the power shut-off includes an interrupt signal sent to the microprocessor. In still another embodiment, the power shut-off includes a relay that terminates the motor control signal sent from the microprocessor to the inverter.

In an embodiment of the above aspect, the motor includes an AC induction motor, wherein the power shut-off de-energizes a magnetic field associated with the motor. In another embodiment, the power shut-off includes a first one-shot circuit and a second one-shot circuit connected in series. In yet another embodiment, the output value is based on at least one of an impedance, a voltage, a current flow, and a frequency. In still another embodiment, the output value includes a measured output frequency value and the predetermined range is based at least in part on a nominal power line frequency range and a tolerance value.

In an embodiment of the above aspect the power shut-off includes a high detection circuit component for comparing the output value, wherein the high detection circuit component detects if the output value is lower than an upper limit of the predetermined range. In another embodiment, the high detection circuit component output is the output frequency value if the output frequency value is less than the upper limit of the predetermined range. In yet another embodiment, the circuit includes a low detection circuit component for comparing the output frequency value, wherein the low detection circuit component detects if the output frequency value is lower than a lower limit of the predetermined range.

In another aspect, the technology relates to a method of safely dissipating electrical energy during the shut-down of a centrifuge having a motor capable of generating electrical energy, the method having: monitoring an output value associated with the electrical energy generated by the motor; disconnecting the centrifuge from an external power source to shut-down the centrifuge; detecting the disconnect from the external power source as a characteristic change in the monitored output value; and disabling the capability of the motor to generate electrical energy.

In another aspect, the technology relates to a method of safely dissipating electrical energy during the shut-down of a centrifuge having a motor capable of generating electrical energy, the method including: monitoring an output value associated with the electrical energy generated by the motor; disconnecting the centrifuge from an external power source to shut-down the centrifuge; detecting the disconnect from the external power source as a characteristic change in the monitored output value; and routing the electrical energy generated by the motor to a shunt circuit that bypasses an external power plug of the centrifuge.

In another aspect, the technology relates to a centrifuge having: an electrical system configured to receive power from an external power source; a motor coupled to the electrical system, the motor capable of operating in a drive mode and in a generator mode, wherein in the drive mode the motor is driven by the power received from the external power source, and wherein in the generator mode the motor generates electrical energy to supply power to the electrical system; and a power cut-off adapted to detect an output value associated with the power supplied by the motor, wherein the power cut-off is further adapted to disable the generator mode of the motor if the power cut-off detects an output value characteristic of power supplied by the motor when the electrical system is not receiving power from the external power source.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

The present disclosure describes a regenerative braking safety system and method. For the purposes of the present disclosure, the systems and methods described herein will be described primarily in a centrifuge embodiment, that is, as being incorporated into a centrifuge instrument having a regenerative braking system. A centrifuge is an instrument that creates a force on an object, such as a laboratory sample, by rapidly rotating the object around a fixed axis. Centrifuges typically involve the rotation of a large mass at high speeds and, thus, inherently have a significant amount of stored kinetic energy when they are turned off that can be recovered via regenerative braking. However, the reader should understand that this is but one embodiment of an instrument with regenerative braking and that the systems and methods described herein are broadly applicable to any piece of equipment that both receives power from an external source and can generate power from regenerative braking.

FIGS. 1A-1D depict motor systems utilizing various embodiments of regenerative braking safety systems 100 that may be included in centrifuge instruments. In general, the centrifuge instrument includes a housing containing the components of the electrical system (described below), a motor system, a centrifuge rotor, a vacuum pump 102 and control components. The motor system may be used in a centrifuge driven by a shaft turned by an AC induction motor 104. Alternative embodiments of the regenerative braking system utilize other types of motors capable of regenerative braking including, but not limited to, switched reluctance drives. For clarity, however, the specification will refer to an embodiment utilizing an AC induction motor driven by a rotating magnetic field. The AC induction motor 104 may include any number of coils. The electrical system may include an inverter 106 including a regenerative brake, as well as a monitoring system or circuit 108, a disconnect or power cut-off 110, and other components, as described herein. The monitoring system may determine both a power condition and a regenerative motor brake state, as described in more detail below. In the depicted embodiments, the monitoring system is a frequency detection circuit, although other detection circuits are contemplated. A power cable is reversibly coupled by a plug 112 to an AC power source, typically a wall outlet connected to an external power grid providing one or more phases of electrical power at a nominal voltage (e.g., 110V, 240V). A circuit breaker 114, microprocessor 116, and a power supply 118 for the microprocessor may also be included, as may an instrument main power switch.

In certain embodiments, the regenerative braking safety system need not include the regenerative brake integral with the instrument, for example, in embodiments where a regenerative braking safety system is a discrete component or device utilized in a retrofit configuration with an existing centrifuge or other instrument. In such a case, the power plug for the instrument could be connected to an outlet on a discrete regenerative braking safety device, which is, in turn, plugged into a wall outlet. In such a case, however, the protections offered by the safety system would be limited to terminating power output from the regenerative braking device, only if that device is unplugged from the wall outlet.

When an external AC power source is removed during use (e.g., if the instrument is unplugged or the power switched off), as the regenerative brake 106 delivers power back into the instrument electrical system, other AC-powered devices in the instrument (here, the vacuum pump 102) have impedance resonances that impose an AC waveform on the power signal. This power delivered back to the instrument is recovered energy converted from kinetic or rotational energy of the rotor during regenerative braking. For this reason, a commercial power supply (such as the type described above) is generally unable to detect that the power was lost, as the commercial power supply continues to detect at least some alternating current.

It has been observed, however, that the frequency of the resulting AC waveform is significantly shifted when power is lost. Depending on the components (e.g., the roughing vacuum pump) located on the power line in the centrifuge, this resonance is different than the nominal frequency of a typical utility AC power. Furthermore, it is possible to even affect the induced AC waveform by placing internal components on the line that intentionally shift the AC frequency when external power is removed and the instrument is operated on regenerative braking power.

In an embodiment of the regenerative braking safety system 100, based on the above observation, a frequency detection circuit 108 is used to determine when the detected AC frequency on the power line of the instrument does not match the nominal AC frequency of externally supplied power during periods of regenerative braking. The frequency detection circuit 108 discriminates between typical, nominal power line frequency (with a tolerance) and the self-resonant, or induced, AC frequency caused by components that are connected to the line and cause a shift in the AC frequency when only operating from regenerated power.

The tolerance value may be determined utilizing a number of criteria as desired for a particular application. In one embodiment, at least two tolerances may be considered to determine the total tolerance value. These tolerances include a line frequency tolerance and a parts or component tolerance. In the United States, the line frequency is fairly consistent, and generally varies in the order of about 1%, or around +/−0.6 Hz (for a 60 Hz nominal frequency line). Instruments manufactured for use in worldwide markets, however, may need to operate on less consistent frequency values. In certain markets, frequencies may vary in the order of about 10%, or around +/−5.0 Hz (for a 50 Hz nominal frequency line, which is typical for many applications outside of the United States).

Instruments manufactured for use both within and outside of the United States, therefore, need to operate on nominal line frequencies ranging from about 50 Hz to about 60 Hz. In such cases, a conservative frequency range may be about 45 Hz to about 66 Hz, assuming about 10% variability in the delivered frequency. In addition to this tolerance, it may be desirable to increase the tolerance value, so that a "worst case" parts tolerance does not cause a false detection. This parts or components tolerance may be selected based on criteria that would be apparent to a person of skill in the art, for example, as dictated by the manufacturing variability of certain components. In certain embodiments, the parts tolerance may be about 5% to about 10% of the nominal line frequency. Other ranges of both line frequency tolerances and parts or components frequency tolerances are contemplated. In short, the total tolerance value range is generally calculated to not give a false detection in the face of power line frequency tolerances and component tolerances.

Figure 1A:
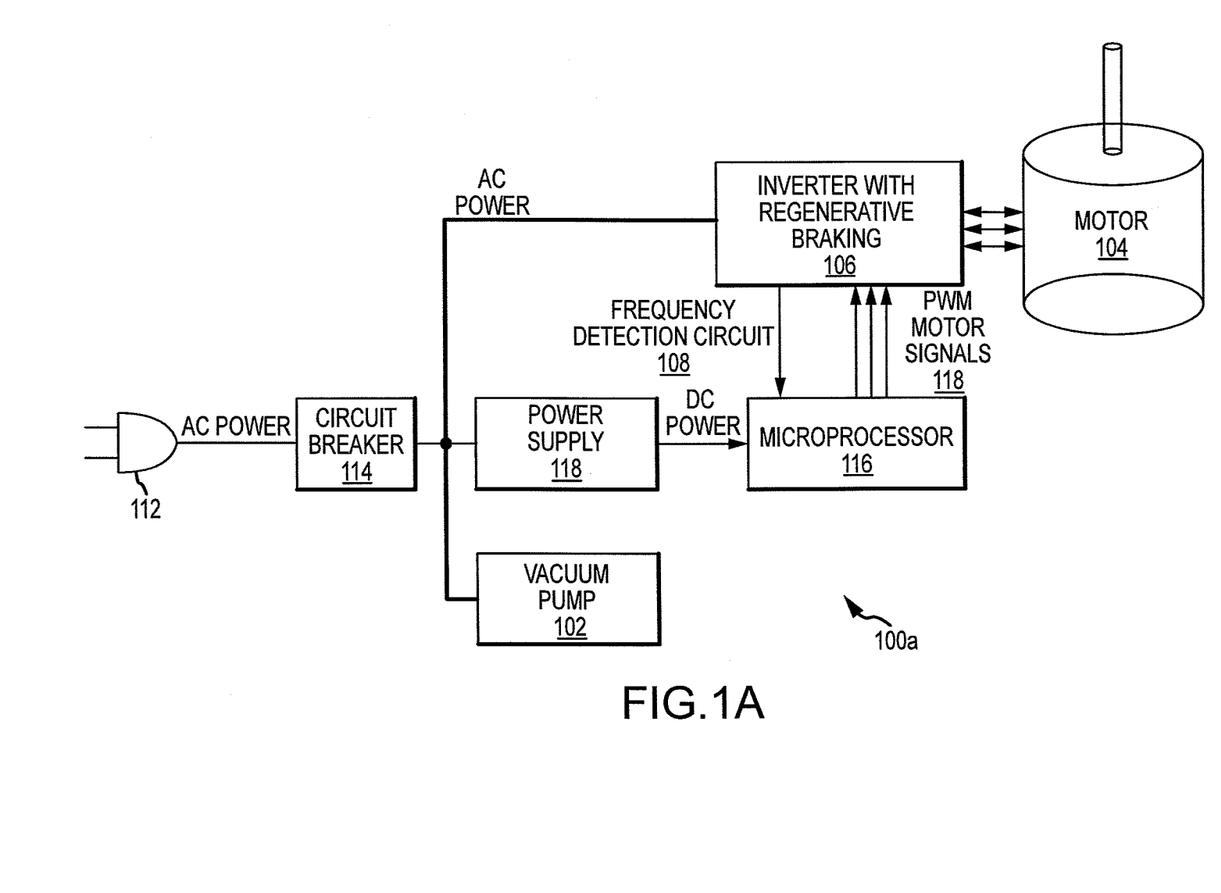
FIGS. 1A-1D are schematic diagrams of motor systems including various embodiments of regenerative braking safety systems.
Figure 1B:
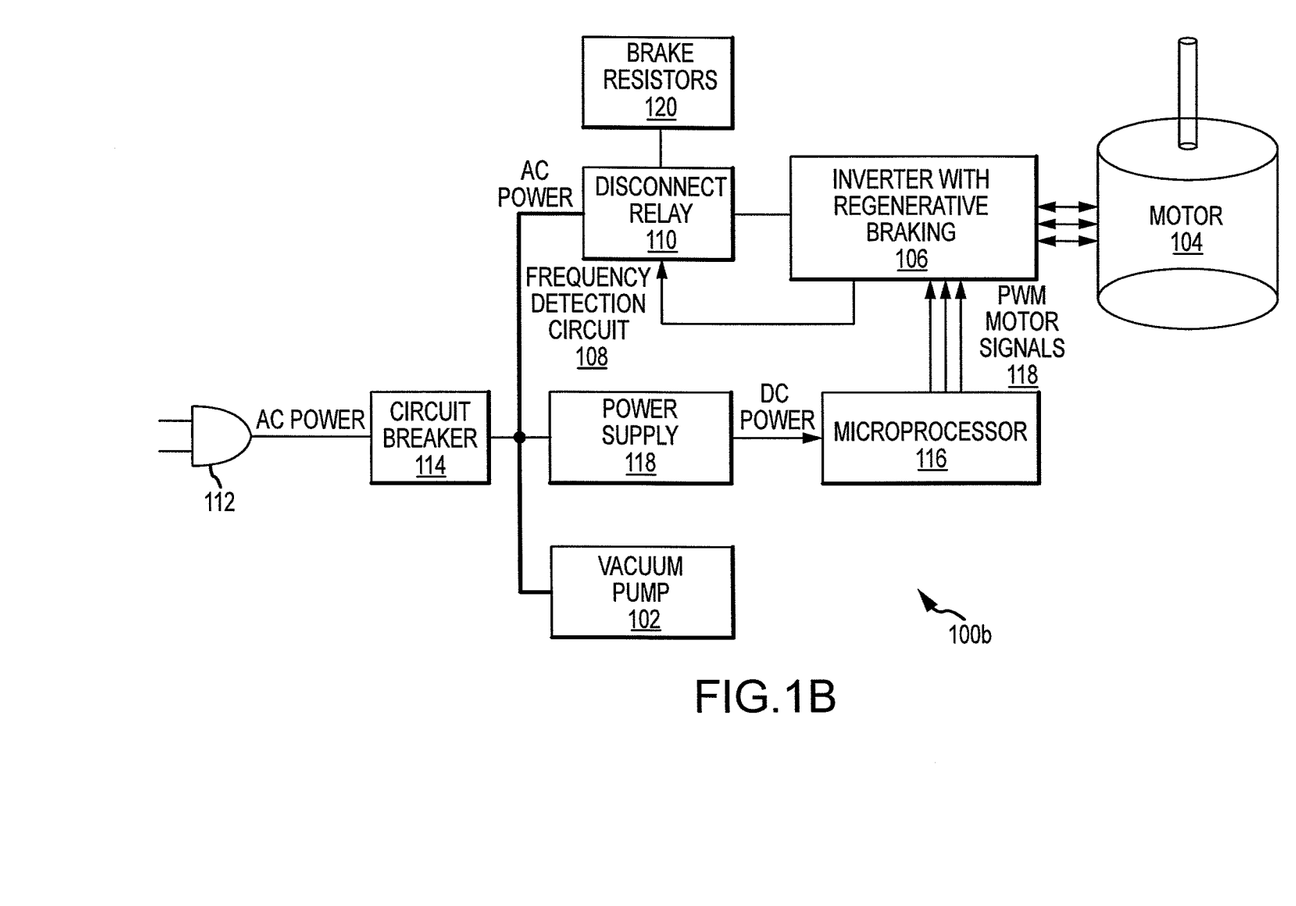

Returning to FIGS. 1A-1D, a number of configurations of the regenerative braking safety system 100 are depicted and described below. FIG. 1A depicts a regenerative braking safety system 100a with the frequency detection circuit 108 on the inverter 106, feeding to an interrupt on the microprocessor 116. The microprocessor 116 uses the low-to-high interrupt signal to halt the drive pulse width modulation (PWM) signals 118 to the inverter 106. Once the PWM signals 118 are halted, the de-energized motor field collapses and delivery of recovered energy to the instrument terminates. In certain embodiments, the safety system may include a shunt circuit or brake resistors 120, to which any recovered energy may be safely dissipated as heat. FIG. 1B depicts a regenerative braking safety system 100b with the frequency detection circuit 108 also on the inverter 106. The detection circuit 108 controls a power disconnect relay 110 or power cut-off that feeds only the inverter 106. When AC power is removed in this configuration, regenerative power is disconnected, and does not allow power to go back to the AC plug 112 or other system components. Since the microprocessor 116 also is no longer powered, it stops the PWM signals 118, the motor field collapses and the regeneration stops.

Figure 1C:
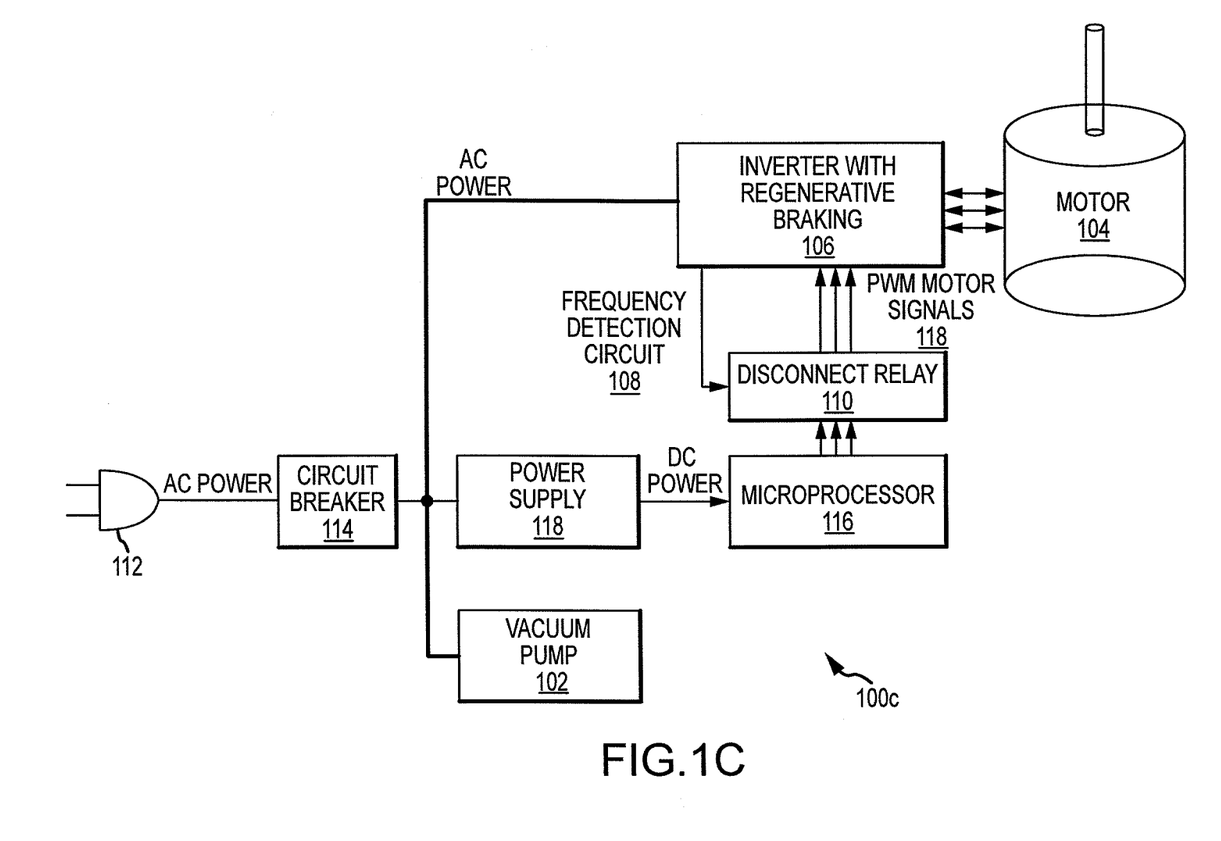
Figure 1D:
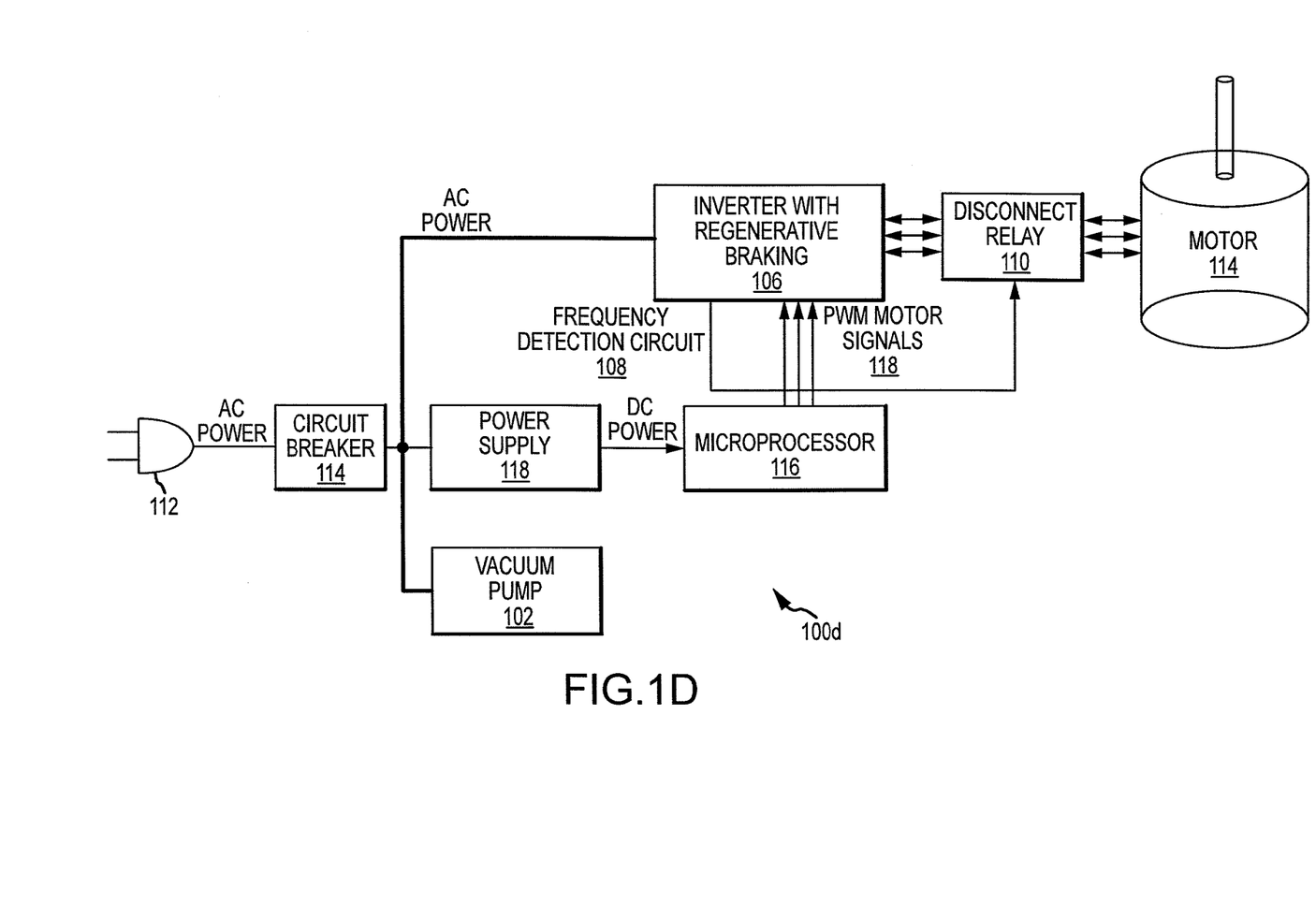

In the embodiment depicted in FIG. 1C, a regenerative braking safety system 100c includes the frequency detection circuit 108 on the inverter 106. The detection circuit 108 controls a power disconnect relay 110 or power cut-off that feeds the PWM signals 118 to the inverter 106. Once the PWM signals 118 are interrupted, the de-energized motor field collapses and regeneration stops. FIG. 1D depicts a regenerative braking safety system 100d with the frequency detection circuit 108 on the inverter 106. This detection circuit 108 controls a power disconnect relay 110 or power cut-off that feeds the motor 104 itself. Once the relay 110 disconnects the motor 104, the field collapses and regeneration stops. Other configurations that prevent regenerated power from reaching the power plug 112 or that otherwise disable the ability of the motor 104 to convert kinetic energy into electrical energy will be apparent to a person of skill in the art.

Figure 2:
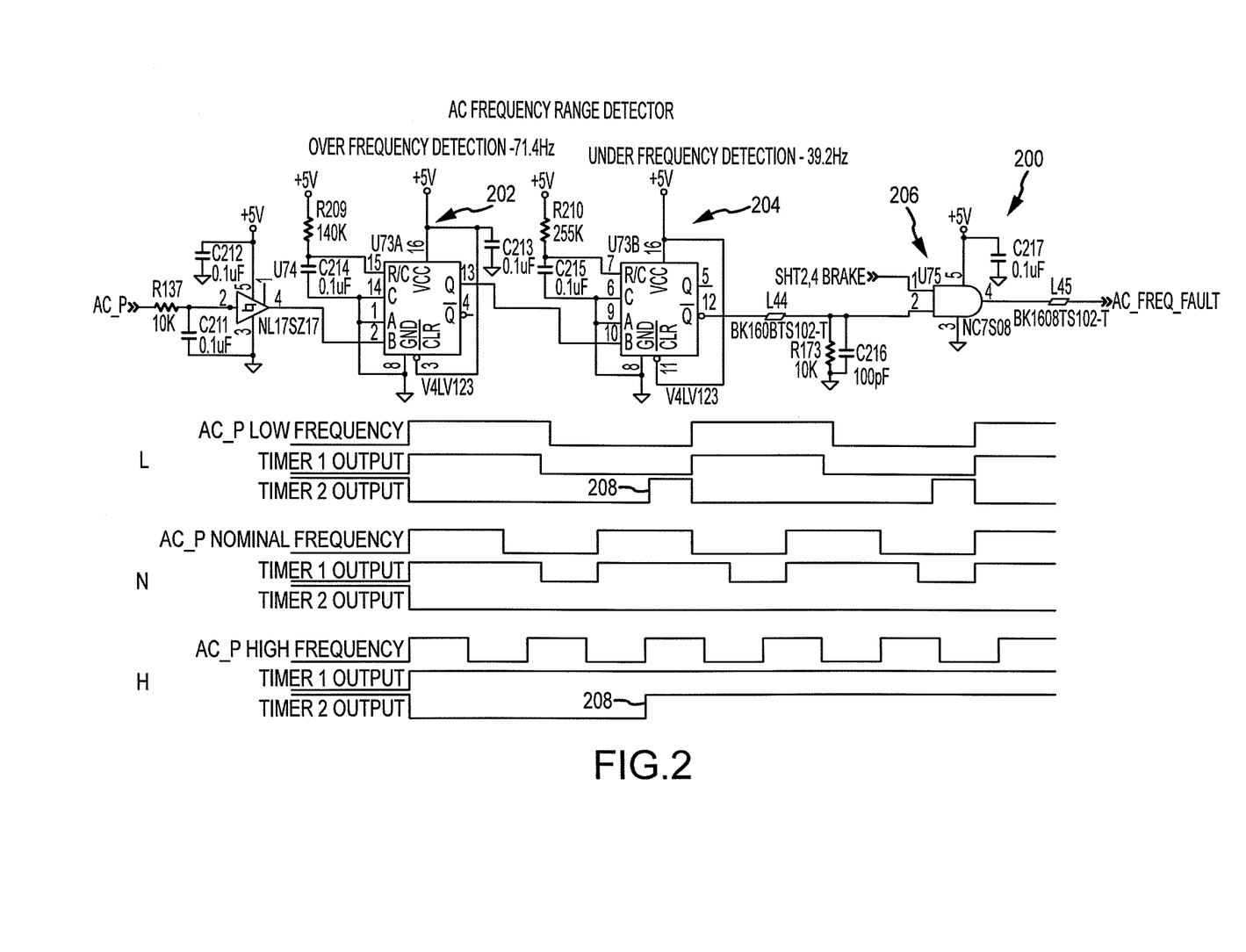
FIG. 2 is a schematic circuit diagram of an AC frequency range detector of a regenerative braking safety system.

A representative frequency detection circuit 200, depicted in FIG. 2, includes two one-shot circuits 202, 204 connected in series. The detected AC frequency is passed through a first one-shot circuit 202 that produces pulse widths at the high end of acceptable power line frequencies. The first one-shot circuit 202 acts as a comparator to compare the detected frequency to the predetermined upper limit of a frequency range. If the detected frequency is higher than this limit, then the first one-shot circuit 202 will continuously trigger and never actually produce a pulse; its output will remain high. If the detected frequency is less than this high frequency limit, then the resulting pulse train is fed to a second one-shot circuit 204. The second one-shot circuit 204 acts as another comparator and compares the line frequency to the predetermined lower limit of the range. If the detected frequency is higher than this low limit, then the output is a constant low voltage, which indicates the detected frequency is typical. But if the detected frequency is lower than this frequency, pulses will occur at the output.

If the detected frequency is higher than the upper limit, the output of the entire circuit will go high and stay high. If the detected frequency is correct, the output will go low and stay low. If the detected frequency is low, the output will pulse high occasionally. Therefore, if any condition (low or high detected line frequency) outside the nominal range occurs, at least one low-to-high transition will occur at the output of this embodiment of the frequency detection circuit. The output of the circuit is then passed to further control electronics 206 so that, if such a transition is detected during a period of regenerative braking, regenerative braking is disengaged.

In the embodiment shown, the further control electronics 206 include a simple logic gate that compares the output of the circuit with a signal indicative of regenerative braking. If such a low-to-high transition occurs, the circuit outputs a determination signal to the logic gate with the regenerative braking signal (so it is only valid when braking is occurring). Thereafter, the output from the logic gate is delivered to an interrupt pin on a control microprocessor or microcontroller of the centrifuge that controls and can cease driving the motor or disconnect the regenerative braking system. In an embodiment, the signal indicative of regenerative braking may be generated by some circuit or element of the instrument based on a current control state of the instrument, a measured current flow, a detected change in speed of the centrifuge or any other signal that is indicative of when regenerative braking is occurring.

In alternative embodiments, the determination signal is sent to a plurality of logic gates, or a determination comparator or microcontroller that compares the regenerative brake signal and the determination signal. The microcontroller will be able to detect the determination signal and take appropriate action, which includes engaging a resistor to cause normal resistive braking or halting the slip to the motor, causing the magnetic field to collapse, which shuts down the instrument and lets the centrifuge decelerate freely. Additionally or alternatively, the microcontroller may engage a mechanical brake.

In FIG. 2, the first circuit 202 detects any frequency above about 71 Hz, and the second circuit 204 detects any frequency below about 39 Hz. Example timing diagrams are also shown for a low frequency L, a nominal frequency N, and a high frequency H. In the case of the low and high frequencies, at least one low-to-high transition 208 is generated on the output of the second timer, which can cause an interrupt to the microprocessor or microcontroller. In the nominal case, there is no low-to-high transition. The threshold frequencies are provided as examples only and, depending on the implementation any threshold or thresholds around a nominal power frequency could be used.

The main components of the safety systems described herein include: (1) a set of components that shifts the AC frequency of a power signal when operating in a regenerative braking mode, with the shifted frequency being outside the normal utility line frequency, and (2) a means of detecting an AC frequency that is outside the expected limits. This can be performed with the circuit embodiment described above, or it may be performed with a phase-lock loop (PLL), a frequency-to-voltage converter, or any other circuit that has the capability of discerning frequency. Other embodiments of regenerative braking safety systems may include circuits for detecting other output values, for example, a circuit impedance, a voltage, a current, or other output waveform characteristic. Such circuits may be configured to compare the detected output value to a corresponding predetermined, known, or otherwise measured output range expected when regenerative braking occurs under normal (e.g., when connected to the external power grid) conditions. The safety system may then cease driving the motor or disconnect when the detected characteristic is outside the range during periods of regenerative braking. The embodiments described above could be provided in addition to any other safety mechanisms such as the overvoltage protection and/or power fail detection circuits known in the art.

Figure 3:
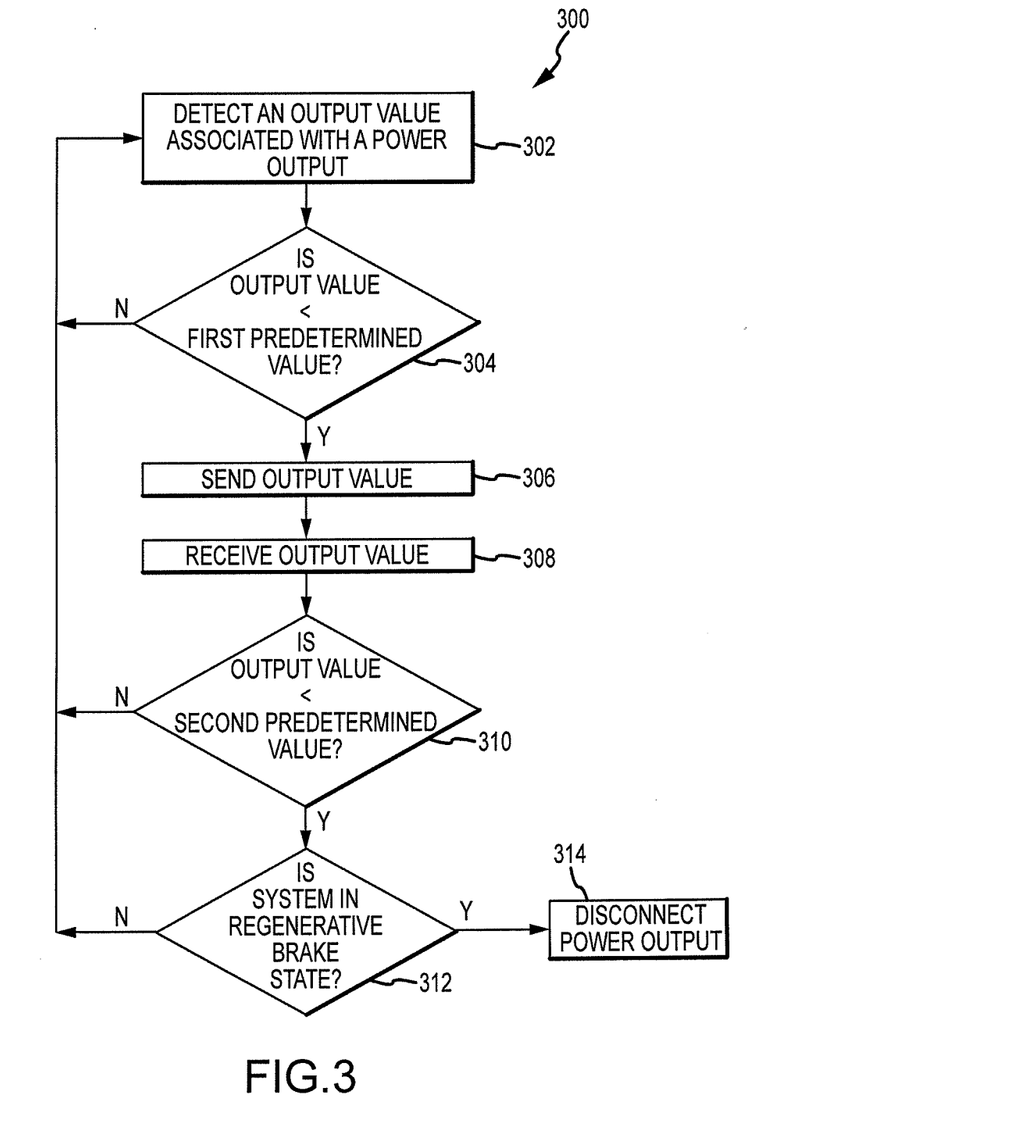
FIG. 3 depicts a method of disconnecting a power output from a regenerative braking system.

FIG. 3 depicts a method 300 of disconnecting a power output from an induction motor in a regenerative brake state. In Step 302, the circuit detects an output value associated with a power output. As described above, the output values may correspond to any of a impedance, a voltage, a current flow, and a frequency. With regard to this particular embodiment, however, frequency values will be described. The signal containing the output frequency value is passed to a first circuit component where it is compared to a first predetermined value (Step 304). If the frequency value is greater than a predetermined high limit of a frequency range, as described above, a constant logical output is passed to a second circuit component and the method returns to the detection step (Step 302). If the frequency value is less that the predetermined high limit, a pulse train matching the frequency value is passed to the second component (Step 306). The received output frequency (Step 308) is then compared again to the predetermined frequency range by the second circuit component (Step 310), this time to the low limit of the range. If higher than the low limit, the circuit outputs a signal (in this case a constant logical low signal) that indicates to the system that the detected frequency is from the external power source and the method returns to the detection step (Step 302). In an alternative embodiment, a single circuit, program, or algorithm may perform the necessary calculations instead of the two one-shot circuits described above.

If the output frequency is, in fact, lower than the low limit or higher than the high limit (in this case indicated by an output that has at least one low-high transition), the method next determines if the motor is in a regenerative brake state (Step 312). As described above, this may be determined based on a signal from the ACIM. If the motor is in the regenerative brake state, the system understands that the frequency value is indicative of an unsafe condition in which regenerative power is being created and the instrument is likely not connected to the power grid. In this situation, the system then disconnects the regenerative braking power output (Step 314). In an additional step, the system may engage a mechanical brake to stop the functioning of the instrument (for example, the centrifuge).

Although described in terms of hardware, the technology described herein can be realized in hardware, software, or a combination of hardware and software. A typical combination of hardware and software can be a general purpose computer system with a computer program that, when being loaded and executed, controls the computer system such that it carries out the methods described herein.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

In the embodiments described above, the software may be configured to run on any computer or workstation such as a PC or PC-compatible machine, an Apple Macintosh, a Sun workstation, a dedicated regenerative brake safety system (i.e., a stand alone device to which a power cable serving an instrument is connected), etc. In general, any device can be used as long as it is able to perform all of the functions and capabilities described herein. The particular type of computer, workstation, or system is not central to the technology, nor is the configuration, location, or design of a database, which may be flat-file, relational, or object-oriented, and may include one or more physical and/or logical components.

Such a general purpose computer may include a network interface continuously connected to the network, and thus support numerous geographically dispersed users and applications. In a typical implementation, the network interface and the other internal components of the servers intercommunicate over a main bi-directional bus. The main sequence of instructions effectuating the functions of the technology can reside on a mass-storage device (such as a hard disk or optical storage unit) as well as in a main system memory during operation. Execution of these instructions and effectuation of the functions of the technology is accomplished by a central-processing unit ("CPU").

A group of functional modules that control the operation of the CPU and effectuate the operations of the technology as described above can be located in system memory (on the server or on a separate machine, as desired). An operating system directs the execution of low-level, basic system functions such as memory allocation, file management, and operation of mass storage devices. At a higher level, a control block, implemented as a series of stored instructions, responds to client-originated access requests by retrieving the user-specific profile and applying the one or more rules as described above.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A centrifuge comprising:
   an electrical system reversibly coupled to an AC power line, wherein an amount of energy is required by the electrical system in order to maintain an operation of the electrical system;
   a motor coupled to the electrical system, wherein the motor is capable of driving a rotor using power delivered through the electrical system, wherein the motor is further capable of supplying the electrical system with recovered energy, wherein said recovered energy is electrical energy converted from kinetic energy of the rotor during regenerative braking of the motor, wherein the electrical system returns the recovered energy to the AC power line when the AC power line is coupled to the electrical system during the regenerative braking of the motor;

a power cut-off configured to disable the effect of regenerative braking of the motor upon detection that the AC power line has been decoupled from the electrical system during the regenerative braking of the motor, wherein the power cut-off is operable to detect the decoupling when the recovered energy generated from the regenerative braking of the motor is greater than or equal to the amount of energy required to maintain the operation of the electrical system; and a frequency detection circuit configured to monitor a frequency associated with the electrical energy returned to the AC power line during the regenerative braking of the motor to detect that the AC power line has been decoupled from the electrical system, the frequency detection circuit comprising:

a first sub-circuit configured to detect if the monitored frequency is higher than a predetermined upper limit; and a second sub-circuit configured to detect if the monitored frequency is lower than a predetermined lower limit.

2. The centrifuge of claim 1, wherein the power cut-off comprises a detector arranged to monitor an output value associated with the recovered energy, wherein the power cut-off is configured to disable the effect of regenerative braking of the motor when the output value is outside of a predetermined range, wherein said predetermined range is determined based at least in part upon a nominal frequency of the AC power line while the electrical system is coupled to the AC power line.

3. The centrifuge of claim 1, wherein the power cut-off is configured to prevent the motor from converting kinetic energy of the rotor into electrical energy when the electrical system is decoupled from the AC power line.

4. The centrifuge of claim 3, wherein the motor is an AC induction motor driven by a rotating magnetic field and wherein the power cut-off is configured to de-energize the rotating magnetic field when the electrical system is decoupled from the AC power line.

5. The centrifuge of claim 1, wherein the electrical system includes a shunt circuit to safely dissipate the recovered energy, wherein the power cut-off is configured to redirect the recovered energy to the shunt circuit when the electrical system is decoupled from the AC power line.

6. The centrifuge of claim 1, wherein the electrical system includes a plug to reversibly couple the electrical system to a power outlet of the AC power line, wherein the power cut-off is configured to disable the effect of regenerative braking of the motor when the plug is unplugged from the power outlet.

7. The centrifuge of claim 6, wherein the power cut-off is configured to prevent recovered power from reaching the plug when the plug is unplugged from the power outlet.

8. The centrifuge of claim 1, wherein the electrical system is reversibly coupled to the AC power line through a main power switch, wherein the power cut-off is configured to disable the effect of regenerative braking of the motor when the main power switch is switched to an off position.

9. The centrifuge of claim 1, wherein the electrical system is reversibly coupled to the AC power line through a main circuit breaker, wherein the power cut-off is configured to disable the effect of regenerative braking of the motor when the main circuit breaker is tripped.

10. The centrifuge of claim 1, wherein the electrical system includes a safety system adapted to detect an electrical fault in the electrical system, wherein the electrical system is reversibly coupled to the AC power line through a safety switch activated by the safety system if an electrical fault is detected, wherein the power cut-off is configured to disable the effect of regenerative braking of the motor when the safety switch is activated by the safety system.

11. The centrifuge of claim 1, wherein the electrical system includes an electrical component powered by the recovered energy, wherein the power cut-off is configured to prevent the electrical component from receiving recovered energy when the electrical system is decoupled from the AC power line.

12. The centrifuge of claim 1, the centrifuge further comprising a comparator that detects when the motor is in a state of regenerative braking, wherein the power cut-off is configured to disable the effect of regenerative braking when the electrical system is decoupled from the AC power line while the comparator detects that the motor is in a state of regenerative braking.

13. The centrifuge of claim 1, wherein the first sub-circuit is configured to be different from the second sub-circuit.

14. A centrifuge comprising:

a circuit reversibly coupled to an AC power line, wherein an amount of energy is required by the circuit in order to maintain an operation of the circuit;

a motor coupled to the circuit to receive power from the AC power line to drive the motor, the motor capable of returning power to the circuit by converting rotational energy into electrical energy during regenerative braking of the motor;

a power cut-off configured to disable the capability of the motor to return power to the circuit upon detection that the AC power line has been decoupled from the circuit during the regenerative braking of the motor, wherein the power cut-off is operable to detect the decoupling when the recovered energy generated from the regenerative braking of the motor is greater than or equal to the amount of energy required to maintain the operation of the electrical system; and a frequency detection circuit configured to monitor a frequency associated with the electrical energy returned to the AC power line during the regenerative braking of the motor to detect that the AC power line has been decoupled from the circuit, the frequency detection circuit comprising:

a first sub-circuit configured to detect if the monitored frequency is higher than a predetermined upper limit; and a second sub-circuit configured to detect if the monitored frequency is lower than a predetermined lower limit.

15. The centrifuge of claim 14, wherein the power cut-off comprises a relay that terminates an electrical connection between the motor and the AC power line.

16. The centrifuge of claim 14, further comprising an inverter that delivers power input to the motor and a microprocessor that sends a motor control signal to the inverter.

17. The centrifuge of claim 16, wherein the power cut-off comprises an interrupt signal sent to the microprocessor.

18. The centrifuge of claim 14, wherein the power cut-off comprises a first one-shot circuit and a second one-shot circuit connected in series.

19. The centrifuge of claim 14, wherein the power cut-off comprises a detector configured to monitor an output value associated with the power returned to the circuit by the motor, wherein the output value comprises a measured output frequency value, and wherein the power cut-off is configured to disable the capability of the motor to return power to the circuit when the output value is outside of a predetermined range, and the predetermined range is based at least in part on a nominal power line frequency range and a tolerance value.

20. The centrifuge of claim 14, wherein the first sub-circuit is configured to be different from the second sub-circuit.

21. A method of safely dissipating electrical energy during the shut-down of a centrifuge having a motor capable of generating electrical energy during regenerative braking of the motor, the method comprising:
   receiving power from an AC power line when the AC power line is coupled to an electrical system of the centrifuge, wherein an amount of energy is required by the electrical system in order to maintain an operation of the electrical system;
   delivering the power to the motor to enable the motor to drive a rotor;
   supplying the electrical system with recovered energy, the recovered energy being generated from the motor during regenerative braking of the motor;
   when the AC power line is coupled to the electrical system during the regenerative braking of the motor, returning the recovered energy to the AC power line;
   detecting that the AC power line is decoupled from the electrical system during the regenerative braking of the motor while the recovered energy generated from the regenerative braking of the motor is greater than or equal to the amount of energy required to maintain the operation of the electrical system; and
   dissipating the recovered energy upon the detection,
   wherein detecting that the AC power line is decoupled from the electrical system during the regenerative braking of the motor comprises:
      monitoring, using a frequency detection circuit, a frequency associated with the electrical energy returned to the AC power line during the regenerative braking of the motor, wherein the frequency detection circuit includes a first sub-circuit and a second sub-circuit;
      detecting, using the first sub-circuit, when the monitored frequency is higher than a predetermined upper limit; and
      detecting, using the second sub-circuit, when the monitored frequency is lower than a predetermined lower limit.

22. The method of claim 21, wherein the first sub-circuit is configured to be different from the second sub-circuit.

23. A centrifuge comprising:
   an electrical system reversibly coupled to a power source;
   a motor coupled to the electrical system, wherein the motor is capable of driving a rotor using power delivered through the electrical system, wherein the motor is further capable of supplying the electrical system with recovered energy, wherein said recovered energy is electrical energy converted from kinetic energy of the rotor during regenerative braking of the motor;
   a frequency detection circuit configured to monitor a frequency associated with the recovered energy supplied to the electrical system during the regenerative braking of the motor; and
   a power cut-off configured to disable the effect of regenerative braking of the motor when the frequency is outside of a predetermined range;
   wherein the predetermined range has a predetermined upper limit and a predetermined lower limit; and
   the frequency detection circuit comprises:
      a first sub-circuit configured to detect if the monitored frequency is higher than the predetermined upper limit; and
      a second sub-circuit configured to detect if the monitored frequency is lower than the predetermined lower limit;
   wherein the first sub-circuit is a first one-shot circuit configured to produce a first output if the monitored frequency is higher than the predetermined upper limit and produce a second output if the monitored frequency is lower than the predetermined upper limit; and
   wherein the second sub-circuit is a second one-shot circuit configured to receive the second output from the first sub-circuit if the monitored frequency is lower than the predetermined upper limit, the second sub-circuit configured to produce a third output if the monitored frequency is higher than the predetermined lower limit and produce a fourth output if the monitored frequency is lower than the predetermined lower limit.

24. The centrifuge of claim 23, wherein the frequency detection circuit further comprises a control device configured to compare the fourth output with a signal indicative of the regenerative braking of the motor.

* * * * *